United States Patent Office 3,028,333
Patented Apr. 3, 1962

3,028,333
DRILLING FLUID
Charles A. Stratton, Washington County, and Armin C. Pitchford and Homer J. Sarrett, Jr., Bartlesville, Okla.; said Stratton assignor to Phillips Petroleum Company, a corporation of Delaware
No Drawing. Filed Apr. 3, 1958, Ser. No. 726,047
22 Claims. (Cl. 252—8.5)

This invention relates to drilling fluids. In another aspect it relates to drilling fluids, such as the aqueous, oil-base, and emulsion types, used in drilling oil and gas wells, and other deep wells. In a further aspect it relates to a method of drilling wells with said drilling fluids, the latter being characterized by desirably low fluid loss, stability in the presence of metal ions, and other desirable rheological properties.

In the art of drilling wells to tap subterranean deposits, such as gas or oil, especially when drilling by the rotary method or the percussion method wherein cuttings must be removed from the bore hole, it is necessary to use a drilling fluid, as is well known to those skilled in the art. The especially prepared drilling fluid is pumped down a hollow drill string or stem within the bore hole, across the drill bit which is attached to the lower end of the drill stem, and is then normally circulated upwardly through the annular space between the drill stem and the bore hole. Circulation of the drilling fluid in this manner removes the cuttings from the bore hole, lubricates and cools the drill bit, seals the wall of the bore hole with a thin, impervious layer of solid material or filter cake, and applies a hydrostatic head to the formation to counterbalance formation pressures.

In addition to having desirable rheological properties such as viscosity and gel strength, it is important that the drilling fluid exhibit a low rate of filtration or fluid loss, that is, the drilling fluid should permit little if any loss of its liquid phase to the formation penetrated, as is well known to those skilled in the art.

Most drilling fluids contain two types of ingredients which are important in determining the fluid loss properties of the drilling fluid. These materials are finely divided clays, such as bentonites and illites, and organo-colloids, such as sodium carboxymethylcellulose, sodium polyacrylates, and the like. However, many of these materials are often contaminated or otherwise affected by the presence of metal ions, notably calcium, the origin of which may be materials deliberately added to the drilling fluid or materials encountered during the drilling operation. When such contamination occurs, the drilling fluid often exhibits poor performance and must be chemically or otherwise treated, and in some cases must be removed and replaced with uncontaminated drilling fluid.

After plugging operations, drilling fluids are often contaminated with cement, a complex mixture of calcium, magnesium, iron, aluminum and silicon compounds. Drilling fluids may also be contaminated during drilling operations by coming into contact with formations such as gypsum and salt which become leached by the drilling fluid and give rise to the presence of contaminating metal ions. In many cases certain salts, such as sodium chloride and calcium chloride, are deliberately added to a drilling fluid to restrict the hydration or swelling of certain formations, such as natural bentonitic materials, and these salts thereby contaminate the drilling fluid.

The aforementioned contaminants often affect the clays and organo-colloid materials in the drilling fluids causing these materials to precipitate, coagulate or flocculate. As a result the viscosity, fluid loss, and other rheological properties of the drilling fluids are adversely affected. Generally, these contaminated drilling fluids become so viscous in character that their circulation becomes difficult and often impossible and it is necessary to chemically or otherwise treat these drilling fluids to regain the desirable rheological properties, or it is necessary to remove the drilling fluids and replace them with uncontaminated drilling fluids.

Accordingly, an object of this invention is to provide a novel drilling fluid. Another object is to provide an improved method of drilling oil and gas wells, or other deep wells, using a novel drilling fluid. Another object is to provide a novel drilling fluid, such as the aqueous, oil-base, or emulsion types, characterized by desirable viscosity, gel strength, fluid loss, and other desirable rheological properties. A further object is to provide a novel drilling fluid which is stable and unaffected by the presence of metal ions, notably calcium, derived from cement, gypsum, salt, and the like materials, which materials often act as contaminants having a deleterious effect on drilling fluids containing clays, such as bentonites and illites, and/or organo-colloid materials such as sodium carboxymethylcellulose, sodium polyacrylate, and the like. A further objective is to provide a drilling fluid containing ammonium or alkali metal salts of sulfonated asphalts. Further objects and advantages of this invention will become apparent to those skilled in the art from the following discussion and appended claims.

Broadly, we have discovered that superior drilling fluids, such as the aqueous, oil-base and emulsion types, can be prepared using the water and oil-dispersible ammonium or alkali metal salts of sulfonated asphalts. These materials are conveniently prepared by sulfonating asphalts with a sulfonating agent, such as fuming sulfuric acid or the like, neutralizing the resulting sulfonic acids, and converting the same to the aforementioned water and oil-dispersible ammonium or alkali metal salts of sulfonated asphalts.

The term "asphalt" or "asphaltic material" as used in this specification and in the appended claims is meant to cover dark brown to black semi-solid or solid cementitious hydrocarbon material which is completely or substantially soluble in carbon disulfide, in which material bitumens are the sole or predominant constituent, these materials occurring in nature as such or being obtained by refining petroleum by distillation, precipitation, cracking, oxidation, or similar operations. The terms "sulfonates," "sulfonated asphalt," and "sulfonated asphaltic material" as used in this specification and appended claims are meant to cover the ammonium or alkali metal salts of asphalt that has been sulfonated with a sulfonation agent, such as oleum. Asphaltic materials useful in preparing the sulfonates of this invention representatively include asphaltenes, maltenes, blown asphalt, straight residual oils, distillation residues, still bottoms, cracking residues, asphaltic bitumens, and the like.

In preparing the sulfonates of this invention, the asphaltic starting material can have a semi-solid or solid consistency and is preferably in a granulated, pulverized, or finely divided form. The asphaltic material can be preliminarily dissolved in a suitable non-sulfonateable, non-aromatic, diluent such as carbon tetrachloride, chloroform, pentane, n-hexane, octanes, gasoline, kerosene, cyclohexane, diesel fuel, and the like. A particularly suitable diluent in many cases will be liquid sulfur dioxide. The diluent can be added serially to the asphaltic material before sulfonation and further amounts may be added after sulfonation. The diluent can be separated from the sulfonation mixture by distillation, simple warming or heating, or extraction with suitable non-polar solvents. In many cases the diluent need not be separated from the sulfonation mixture, especially where the sulfonates are to be used in preparing oil-containing drilling fluids, such as the oil-base and emulsion types.

Sulfonation temperatures are usually controlled within the range of about 0 to 250° F., with the preferred operating range being between 32 and 100° F. Lower temperatures are somewhat preferred since above about 200° F. excessive oxidation with liberation of sulfur dioxide may take place. The asphalt-sulfonating agent weight ratio will vary with the sulfonation temperature and asphalt starting material, but generally will be in the range from 1:0.12 and 1:1. The sulfonation reaction is usually carried out at atmospheric pressure although pressures greater or less than atmospheric can be employed if desired.

Sulfonating agents which can be utilized in the sulfonation step include fuming sulfuric acid, chlorosulfonic acid, concentrated sulfuric acid, and sulfur trioxide. The fuming sulfuric acid can vary from about 10 to 40 weight percent excess $SO_3$; however, we prefer to use commercial fuming sulfuric acid which has about 20 weight percent excess $SO_3$, this type of fuming sulfuric acid being known as oleum.

In the practice of this invention, oleum and anhydrous $SO_3$ are the preferred sulfonating agents. The sulfonating agent is preferably added dropwise or in increments to the asphaltic material with stirring or agitation. The sulfonation reaction can be stopped by the addition of water to the reaction mixture.

As pointed out hereinbefore, in many cases it would be desirable to separate the diluent from the reaction mixture after the sulfonation step; this separation can be accomplished by distilling off the diluent, or it can be accomplished by extraction, simple heating, or stripping for example, with air. Prior to the neutralization of the resulting sulfonic acids, excess $SO_2$ can be removed from the reaction mixture in any convenient manner, for example, by simple warming or by stripping with air.

The sulfonation reaction mixture can then be directly neutralized or can first be preliminarily separated by filtration or the like into a sulfonic acid phase and a sludge phase containing unreacted starting material.

The sulfonic acids are neutralized by contacting them with anhydrous or aqueous ammonia, or an aqueous solution or slurry of an alkali metal salt, oxide, or hydroxide, thereby converting the sulfonic acids to the corresponding ammonium or metal sulfonates. Metals which are particularly suitable for preparing the sulfonates of this invention include the alkali metals such as sodium and potassium. The preferred sulfonates of this invention are the ammonium and sodium sulfonates.

The neutralization step can be conveniently carried out over a wide temperature range, e.g., 200–240° F., and at a pressure preferably sufficient to prevent evaporation of the volatile materials present. Repeated amounts of the neutralizing agent can be added so as to insure complete neutralization. Both before and after neutralization it is desirable in many cases to strip off any $SO_2$ remaining in the sulfonation mixture. In many cases it may be desirable to strip off the aforementioned diluent after the neutralization step, as mentioned hereinbefore. It is also within the scope of this invention to use a combination of neutralizing agents; for example, the sulfonic acids can be neutralized with first anhydrous ammonia and then sodium hydroxide, or first sodium hydroxide and then anhydrous ammonia. After neutralization, the pH of the neutralized mixture can be adjusted, for example by adding concentrated sulfuric acid. In some cases it may be desirable to neutralize the sulfonic acid mixture in situ in the drilling fluid.

After the neutralization step, the neutralized mixture can be allowed to settle and then separated, for example, by decantation, centrifugation, filtration, or the like, to separate the sulfonates from sludge or other unreacted material. In some cases, depending upon the particular starting material utilized, the sulfonation and neutralization can be carried out under substantially dry or anhydrous conditions. The resultant sulfonate product can be dried or diluted with water or oil.

The resulting sulfonate used in the practice of this invention has a chemical nature which is very difficult to accurately ascertain due to the complexity of the asphaltic starting material, although generally it will have a sulfur content in the range between about 3 to 30 percent. The source of the starting material is one of the several variables which determine the predominant organic nature of the sulfonates, i.e., paraffinic, naphthenic or aromatic. In the absence of chemical analysis, the sulfonates of this invention can be characterized as dispersible in water and/or oil. These sulfonates have a wide range of dispersibility in water and oil, that is, depending on the nature of the asphaltic starting material, the degree of sulfonation and neutralization, etc., these materials will form true solutions, colloidal and super colloidal suspensions, and suspensions in which the sulfonates are relatively insoluble though finely divided and dispersible.

In the drilling fluids prepared according to this invention, the sulfonates are dispersed in either the aqueous or oil phase. As mentioned hereinbefore, the drilling fluids prepared according to this invention and containing the aforementioned sulfonated asphalt, have desirable rheological properties, notably viscosity and fluid loss, which are not adversely affected by the presence of soluble metal ions, primarily polyvalent metal ions such as calcium, derived from gypsum formations, salt deposits, or cement. Furthermore, the drilling fluids of this invention are capable of taking up a considerable proportion of the finely divided bit cuttings or drilled solids without adverse effect on the properties of the drilling fluids.

The drilling fluids of this invention can be prepared by any conventional method. The amount of sulfonate, water, and oil employed are dependent upon several variables, such as the nature of the sulfonate itself, the density of the drilling fluid desired, the nature of the formation penetrated, and other factors that can be readily determined by those skilled in the art upon being acquainted with this invention. It has long been customary in rotary well drilling operations to subject the drilling fluid to simple routine tests from time to time, and these tests are sufficient to indicate the relative amounts of sulfonate, water, or oil to be employed. Generally, the amount of sulfonate employed will be sufficient to form a relatively thin, impervious filter cake on the wall of the well, and in an amount that will impart a sufficiently low viscosity to the drilling mud in order that it may readily be pumped and circulated. In general, the amount of sulfonate added to the drilling fluid will be in the range from about 0.1 to about 10 pounds per barrel (42 U.S. gallons) of drilling fluid.

For water-in-oil emulsion systems, the amount of water to be employed would generally range from as low as 1 percent by weight of the final drilling fluid to 60 percent by weight, and preferably less than 40 percent by weight. For oil-in-water emulsion systems, the amount of water will be in the range from about between 99 to 60 percent by weight of the final emulsion and the amount of oil will be in the range from 1 to 40 percent by weight of the final emulsion.

The oil component used in preparing the oil-base and emulsion drilling fluids of this invention can be any hydrocarbon normally used for this purpose in the art, such as diesel fuel, crude oil, kerosene, gas oil, heavy fuel oil, various petroleum fractions, and the like.

Although the drilling fluids of this invention need only contain the water-dispersible and oil-dispersible sulfonated asphalt as the material necessary to obtain desirable rheological properties, especially low fluid loss, it is within the scope of this invention to add clays or other finely divided inorganic solids. In addition, materials commonly used for weighting purposes can be added, including finely divided limestone, barite, lead sulfide, oyster shell, or the like. For emulsion systems any suitable conventional emulsifying agent, such as the alkaline earth metal salts of saponifiable oils such as vegetable oils, wood oils, fish oils and the like, can be employed. Other applicable emulsifying agents include "dresinates," alkali and alkaline earth salts of lignin, alkali metal salts of carboxy methyl cellulose, and the like. In general, the emulsion drilling fluids prepared according to this invention are relatively stable type emulsions.

The following examples and discussion are illustrative of this invention and specific details for preparing the sulfonates and drilling fluids of this invention are merely illustrative of preferred embodiment thereof and are not to be construed as unduly limiting this invention.

*Example I*

A series of water base drilling fluid containing various sulfonated asphaltic materials according to this invention were prepared and their properties were determined according to "Recommended Practice on Standard Field Procedures for Testing Drilling Fluids," A.P.I. Code No. 29. For purposes of comparison and to demonstrate further advantages of this invention, another series of conventional water base drilling fluids containing clay were also prepared and tested, the clay mud in this series comprising:

|  | Weight percent |
| --- | --- |
| Bentonite | 1.6 |
| Kaolin | 17.9 |
| Water | 80.5 |

The compositions and properties of all these drilling fluids are set forth in the following table.

of this invention possess desirable drilling fluid properties even in the presence of materials which normally contaminate clay-containing drilling fluids. Furthermore, the data show that the drilling fluids of this invention are not dependent upon the presence of deliberately added clays to effect their desirable properties.

*Example II*

A cracked asphalt was sulfonated in the following manner. This cracked asphalt was obtained from a secondary vacuum tower of a cracking unit and had a specific gravity of 1.188 at 60° F., a penetration of 0 at 77° F. (100 gm. wt., 5 sec.) and a Ring and Ball Softening Point of 205° F. Two hundred grams of the cracked asphalt were dissolved by heating in 300 ml. of $CCl_4$. The solution was cooled and put in an ice bath. One hundred ml. of 20% oleum were added to the solution dropwise with stirring over a period of 5 hours during which the temperature of the reaction mixture was held between 44 and 48° F. The solution was stirred for 10 minutes after the final addition of the oleum and then 400 ml. of water were added dropwise. The $CCl_4$ was removed by distillation. Twenty grams of NaOH, plus a small amount of water, were added to the reaction mixture and the solution was heated to expel $SO_2$. One hundred and ten grams of NaOH were then added and the solution was boiled. The pH of the solution was 12.2, and the pH of the solution was then adjusted to 8.4 with sulfuric acid. The solution was stirred at high speed in a Waring Blendor for 10 minutes and then shaken in a two-liter mixing cylinder and allowed to settle over a period of 3 hours. The suspended cracked asphalt sulfonate material was decanted from 120 ml. of sludge. The decanted cracked asphalt sodium sulfonate was then

|  | Drilling Fluid Sample | | | | | | | | | | | | | | | |
| --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 | 14 | 15 | 16 |
| Ingredients: | | | | | | | | | | | | | | | | |
| Clay mud, ml | 350 | 350 | 350 | 350 | 350 | 350 | 350 | 350 | 350 | 350 | 0 | 0 | 0 | 0 | 0 | 0 |
| Sodium carboxymethyl cellulose, gm | 0 | 0 | 0 | 0 | 0 | 3 | 3 | 3 | 3 | 3 | 0 | 0 | 0 | 0 | 0 | 0 |
| Sulfonated cracked asphalt, [a] ml | 0 | 0 | 0 | 0 | 0 | 0 | 0 | 0 | 0 | 0 | 175 | 0 | 0 | 0 | 0 | 0 |
| Sulfonated asphaltenes [b], ml | 0 | 0 | 0 | 0 | 0 | 0 | 0 | 0 | 0 | 0 | 0 | 175 | 175 | 175 | 175 | 175 |
| Water, ml | 0 | 0 | 0 | 0 | 0 | 0 | 0 | 0 | 0 | 0 | 175 | 175 | 175 | 175 | 175 | 175 |
| Sodium chloride, gm | 0 | 15 | 0 | 0 | 0 | 0 | 15 | 0 | 0 | 0 | 0 | 0 | 15 | 0 | 0 | 0 |
| Gypsum ($CaSO_4.2H_2O$), gm | 0 | 0 | 3 | 0 | 0 | 0 | 0 | 3 | 0 | 0 | 0 | 0 | 0 | 3 | 0 | 0 |
| Dewey Portland cement, gm | 0 | 0 | 0 | 15 | 0 | 0 | 0 | 0 | 15 | 0 | 0 | 0 | 0 | 0 | 15 | 0 |
| McCracken Clay [c], gm | 0 | 0 | 0 | 0 | 80 | 0 | 0 | 0 | 0 | 80 | 0 | 0 | 0 | 0 | 0 | 80 |
| A.P.I. Properties: | | | | | | | | | | | | | | | | |
| Apparent viscosity, cp | 6 | 12 | 10 | 26 | 39 | 52 | 17 | 22 | 26 | 79 |  | 2 | 2 | 3 | 22 | 20 |
| Plastic viscosity, cp | 4 | 3 | 4 | 4 | 10 | 40 | 13 | 16 | 20 | 45 |  | 1 | 16 | 2 | 11 | 9 |
| Yield value, lb./100 sq. ft | 3 | 17 | 12 | 44 | 57 | 24 | 8 | 11 | 11 | 68 |  | 1 | 2 | 2 | 22 | 21 |
| Initial gel, lb./100 sq. ft | 0 | 14 | 11 | 16 | 32 | 4 | 2 | 3 | 3 | 75 |  | 0 | 0 | 0 | 4 | 3 |
| 10-minute gel, lb./100 sq. ft | 3 | 18 | 10 | 31 | 33 | 21 | 12 | 15 | 16 | 272 |  | 0 | 0 | 0 | 7 | 5 |
| 30-minute water loss, ml | 28 | 79 | 80 | 226 | 40 | 4.9 | 5.6 | 5.3 | 5.7 | 3.7 | 5 | 3.9 | 4.8 | 4.8 | 4.8 | 6.3 |

[a] Prepared according to Example II, containing 18 wt. percent solids.
[b] Prepared according to Example III, containing 16 wt. percent solids.
[c] A low yield clay.

The filter or water loss properties of the water base, clay-containing samples 1–5, reported above, are excessive due to the contamination with salt, gypsum, cement and low yield clay solids. In contrast thereto, the filter loss properties of the water base, sulfonated asphaltic material containing drilling fluids of this invention, samples 11–16, are relatively low even in the presence of the same contaminants, indicating the advantageous stability of these drilling fluids.

Although the results tabulated in the above table for samples 6–10 show that the fluid loss of a clay-containing drilling fluid can be improved by the addition of an organo-colloid, sodium carboxymethyl cellulose, a comparison of the results of sample 10 with that of sample 16 (containing a sulfonated asphalt) show that the clay-containing drilling fluid has a poorer tolerance for additional clay solids than that containing the sulfonated asphalt (i.e., the viscosity and gel values for sample 10 are excessive).

In general, the above data show that the drilling fluids diluted to about 2000 ml., and this solution was used in preparing the water base drilling fluids reported as sample 11 in Example I.

*Example III*

A cracked asphaltene was sulfonated in the following manner. This material was a pentane-insoluble fraction obtained by mixing one part of the cracked asphalt starting material of Example II with 10 parts of n-pentane at room temperature. Two hundred grams of the cracked asphaltenes were dissolved in 300 ml. of $CCl_4$. The solution was cooled and placed in an ice bath. One hundred ml. of 20 percent oleum were added dropwise with stirring over a period of 3 hours, 15 minutes, during which the maximum temperature of the reaction mixture was about 60° F. Two hundred ml. of water were added dropwise to the reaction mixture and the $CCl_4$ was then removed by vacuum distillation. To the reaction mixture, 1100 ml. of water and 80 grams of NaOH (dissolved in the water) were added and the reaction material had a pH of 0.7. $SO_2$ was removed from the reaction material by boiling the same. Then 40 grams of NaOH were added, making the pH of the mixture 11.5. Sulfuric acid was then added to the mixture until the pH was 4.1. The reaction material was then boiled and stripped with air until all the $SO_2$ was removed and the pH of the mixture was 2.3. Four grams of NaOH were then added making the pH of the mixture 11.7. The reaction mixture was then stirred in a Waring Blendor for 8 minutes at high speed, after which it was poured into a cylinder and allowed to stand overnight. After standing, the liquid phase was decanted from about 140 ml. of sediment. The decanted liquid phase was diluted to 2000 ml. with water. The diluted sulfonated cracked asphaltenes had a solids content of 16 percent. Solution of this nature was used in preparing the water base drilling fluids reported as samples 12–16 of Example I.

*Example IV*

A sulfonated asphalt was prepared in the following manner. This material was obtained from a Colorado crude oil that was topped, the topped crude then being flashed at 605° F. and 1.4 mm. of mercury pressure in a vacuum still, the asphalt being 18.5 percent of the crude charge and having a penetration of 70 at 77° F. (100 gm., 5 sec.). Two hundred grams of this asphalt were dissolved in 300 ml. of $CCl_4$ by refluxing. One hundred ml. of oleum were added dropwise with stirring to the solution, over a period of 2 hours, 40 minutes, during which the maximum temperature was about 60° F. During sulfonation, 100 ml. of additional $CCl_4$ was added in order to complete the viscosity breakdown. Two hundred ml. of water were then added dropwise to the sulfonation mixture. The $CCl_4$ was then removed by vacuum distillation. Twelve hundred ml. of water and 70 ml. of NaOH (.5 gm. NaOH per ml.) were added to the residue, which was still acid to litmus. The neutralized mixture was then boiled for two hours to expel $SO_2$, after which 20 grams of NaOH were added, the pH of the mixture then being 10.5. The neutralized solution was stirred 10 minutes in a Waring Blendor and then diluted to 1800 ml. with water and allowed to stand overnight in a 2000 ml. cylinder. The sulfonated mixture phase was then decanted from 100 ml. of sludge, the sulfonated mixture then being diluted to 2000 ml. with water.

A water base drilling fluid was then prepared comprising 175 ml. of this solution and 175 ml. of water; the fluid loss of this drilling fluid was determined and found to be 15 ml.

*Example V*

A sulfonated cracked asphalt was prepared in the following manner, the starting material being the same as that of Example II. Two hundred grams of the cracked asphalt were dissolved in 300 ml. of $CCl_4$ by refluxing. The solution was cooled and then 140 ml. of oleum were added dropwise with stirring over a period of two hours, during which the maximum temperature was about 60° F. During sulfonation, 100 ml. of $CCl_4$ were added to keep the viscosity down. The reaction mixture was stirred 10 minutes after the last addition of the oleum and then 65 ml. of water were added dropwise. The $CCl_4$ was then removed from the reaction mixture by vacuum distillation. Seven hundred and thirty five ml. of water and 179.2 grams of NaOH were added to the sulfonation mixture, bringing the pH to 7.5. The neutralized solution was then diluted to 2000 ml. with water and allowed to stand overnight. The supernatant solution was decanted away from 190 ml. of settled sludge and diluted with water to 2000 ml.

A water base drilling fluid comprising 100 ml. of this solution and 100 ml. of water was found to have a fluid loss of 4.3 ml.

*Example VI*

A sulfonated, cracked asphalt was prepared in the following manner, the starting material being the same as that of Examples II and V. Three hundred grams of the crushed, cracked asphalt were dissolved in about 15 ml. of liquid sulfur dioxide at a temperature below 14° F. One hundred ml. of anhydrous $SO_3$ were added dropwise with stirring over a period of one hour and stirring was continued 30 minutes after the last addition of $SO_3$. The $SO_2$ was allowed to evaporate by warming the reaction mixture to room temperature. The resulting sulfonation mixture was then neutralized by blowing the same with anhydrous ammonia. The resulting neutralized sulfonated cracked asphalt was ground to pass a No. 30 sieve.

A water base drilling fluid comprising 20 grams of the sulfonated asphalt, 5 grams McCracken clay, 10 grams $(NH_4)_2CO_3$, and 160 ml. water, had a fluid loss of 8.0 ml.

*Example VII*

A sulfonated asphalt was prepared in the following manner, this material having been the residual product from a third stage vacuum tower when charged with 100% West Texas-New Mexico crude oil. This asphalt had a penetration of 11 at 150° F. (100 gm. weight, 5 sec.), and a Ring and Ball Softening Point of 209° F. Three hundred grams of the asphalt were ground to pass a 6-mesh screen. Seven hundred ml. of $CCl_4$ were added to the asphalt and refluxed to dissolve the same. The solution was then cooled with ice. Fifty ml. of $SO_3$ were added dropwise with stirring over a period of 1.5 hours. Fifty ml. of additional $CCl_4$ were then added to the reaction mixture. The reaction mixture was then stirred 15 minutes and allowed to settle for 15 minutes, after which 150 ml. of water were added and the solution then stirred for 5 minutes. Ninety-seven ml. of aqueous NaOH (0.5 gm. of NaOH per ml.) were added to the sulfonation mixture with stirring, after which the $CCl_4$ was removed by vacuum distillation. The remaining sulfonated asphalt solid was dried for two days in an oven at about 222° F., after which the dried sample was ground.

A water base drilling fluid comprising 30 grams of this product and 170 ml. of water was found to have a fluid loss of 12.5 ml.

*Example VIII*

A sulfonated cracked asphalt was prepared in the following manner from the same starting material as that employed in Example VII. Thirty grams of the asphalt were pulverized in a small Waring Blendor, and while the latter was running, 5 ml. of $SO_3$ were added to the tumbling asphalt powder in the Blendor. The Blendor was then stopped and the sulfonated asphalt then treated with anhydrous ammonia. The resulting neutralized sulfonated asphalt product was then pulverized again in the Blendor.

A water base drilling fluid comprising 30 grams of this product, 15 grams of $NaHCO_3$, and 170 ml. of water was found to have a fluid loss of 8.0 ml.

*Example IX*

A sulfonated cracked asphalt was prepared in the following manner, employing the same starting material as that of Examples VII and VIII. Three hundred grams of the cracked asphalt were dissolved in 800 ml. of No. 2 diesel fuel by heating to 275° F., after which the solution was cooled in an ice bath. Sixty ml. of 20% oleum were then added dropwise to the solution with stirring over a period of 38 minutes. The reaction mixture was stirred an additional 5 minutes and then allowed to stand 5 minutes. Anhydrous ammonia was then passed into the sulfonation mixture over a period of 2 hours, 12 minutes. When the anhydrous ammonia stream was stopped, $SO_2$ was evolved. One hundred ml. of water were then added in order to improve the uptake of the anhydrous ammonia. After further blowing with anhydrous ammonia, the sample was then heated to 300° F. to remove water and $SO_2$. After cooling, further anhydrous ammonia was blown in the reaction mixture. The resulting oil solution of the sulfonated asphalt was then mixed in a Waring Blendor for 5 minutes.

This oil solution (100 ml.) was found to have a fluid loss of 0 at room temperature. An oil base drilling fluid comprising 100 ml. of this solution and 100 ml. of No. 2 diesel fuel had a fluid loss of 3.3 ml. at room temperature. A water-in-oil emulsion drilling fluid comprising 100 ml. of the sulfonate solution, 200 ml. of water and 100 ml. of No. 2 diesel fuel, exhibited good emulsion stability.

*Example X*

A sulfonated asphalt was prepared in the following manner from refinery residium or pitch having a penetration of 0 at 77° F. and a Ring and Ball Softening Point of 245° F. The asphalt material was first ground to pass through a No. 60 sieve. Three hundred grams of this ground asphalt were dispersed and/or dissolved in 800 ml. of n-hexane by stirring. The hexane solution was placed in an ice bath and 60 ml. of oleum were added dropwise with stirring over a period of 50 minutes, the reaction mixture being stirred for 10 minutes after the last addition of oleum. Sixty ml. of water were then added slowly with stirring, stirring being continued an additional 5 minutes after the last addition of water. Anhydrous ammonia was then blown into the reaction mixture for several minutes. The hexane was removed by vacuum distillation and the sulfonated asphalt residue dried with a heat lamp. The residue was then blown again with anhydrous ammonia, after which it was ground in a Waring Blendor to pass through a 16 mesh sieve.

A water base drilling fluid comprising 30 grams of this sulfonated material and 170 ml. of water was found to have a fluid loss of 12.1 ml. at room temperature, and a similar water base drilling fluid comprising in addition 5 grams of McCracken clay was found to have a fluid loss of 8.4 ml. at room temperature. An oil base drilling fluid comprising 30 grams of the sulfonated material and 170 ml. of No. 2 diesel fuel was found to have a fluid loss (oil) of 7.9 ml. A water-in-oil emulsion drilling fluid comprising 30 grams of the sulfonated material, 5 grams of McCracken clay, 25 ml. of water and 170 ml. of No. 2 diesel fuel was found to have a fluid loss of 26 ml.

*Example XI*

A sulfonated asphalt was prepared in the following manner, the material having been obtained by refining a mixture of West Texas and West Kansas crude and having a penetration of 90 at 77° F., a Ring and Ball Softening Point of 115° F., and a specific gravity of 1.01. Three hundred grams of the asphalt were dissolved by heating in 800 ml. of n-hexane. The solution was cooled in an ice bath and then 50 ml. of oleum were added dropwise with stirring over a period of 20 minutes, after which the reaction mixture was stirred for an additional 10 minutes. Fifty ml. of water were slowly added to the reaction mixture and the solution then stirred for 10 minutes. Anhydrous ammonia was then blown in the reaction mixture for 50 minutes. The n-hexane was removed by vacuum distillation. The solid sulfonated asphalt product was dried under a heat lamp and then in an oven at about 222° F., after which the dried product was then blown with anhydrous ammonia and then ground.

Two oil base drilling fluids were prepared, the first comprising 20 grams of the sulfonated material and 180 ml. of No. 2 diesel fuel, and the second comprising 10 grams of the sulfonated material and 190 ml. of No. 2 diesel fuel. The first drilling fluid had a fluid loss (oil) of 11.8 ml., and the second had a fluid loss (oil) of 14.7 ml. Both drilling fluids were then mixed with 200 ml. of water with stirring, and stable water-in-oil emulsions resulted in both cases.

*Example XII*

A sulfonated cracked asphalt was prepared in the following manner, the starting material being the same as that of Examples VII, VIII and IX. Three hundred grams of the ground cracked asphalt were dissolved in 1100 ml. of n-hexane with heating and stirring. The solution was cooled in an ice bath. Sixty ml. of sulfur trioxide were added dropwise with stirring to the reaction mixture over a period of 20 minutes. One hundred ml. of water were then added slowly with stirring and the solution was stirred an additional 10 minutes after the last of the water was added. One hundred and twenty ml. of aqueous NaOH (0.5 gm. NaOH per ml.) were added slowly to the sulfonation mixture followed by 10 minute stirring. The n-hexane was then removed by vacuum distillation and the remaining product was dried on a hot plate under a heat lamp and then dried in an oven at about 222° F. for one hour. The resulting dried sulfonated asphalt was ground to pass a 16 mesh screen, after which it was treated with anhydrous ammonia.

A water base drilling fluid comprising 30 gm. of the sulfonated material and 170 ml. of water gave a fluid loss of 5.8 ml. An oil base drilling fluid comprising 10 gm. of the sulfonated material and 390 ml. of No. 2 diesel fuel gave a fluid loss (oil) of 2.6 ml. A water-in-oil emulsion drilling fluid comprising 10 gm. of the sulfonated material, 80 gm. of NaCl, 300 ml. of water and 390 ml. of No. 2 diesel fuel exhibited very good emulsion stability.

*Example XIII*

A sulfonated cracked asphalt was prepared in the following manner, utilizing the starting material of Examples VII, VIII, IX, and X. Five hundred grams of the cracked asphalt were dissolved and dispersed with n-hexane by refluxing. The resulting solution was filtered on paper and the insoluble material retained on the paper washed with fresh n-hexane. The residue retained by the filter paper, comprising a major portion of the asphaltenes in the asphalt, was dried in a vacuum oven and the weight of the asphaltenes was 145.2 grams. The material dissolved in the aforementioned filtrate weighed about 340 grams and comprised maltenes (and non-filtered asphaltenes) in the n-hexane solution. The latter solution was cooled and 55 ml. of $SO_3$ were added dropwise with stirring over a period of 30 minutes, after which the resulting sulfonation mixture was stirred 5 minutes. One hundred ml. of water were added over a period of 12 minutes. An aqueous solution of 55 gms. NaOH in 75 ml. of water were then added to the sulfonation mixture over a period of 4 minutes, after which the reaction mixture was stirred for 11 minutes. The n-hexane was removed from the reaction mixture by vacuum distillation. The resulting sulfonated asphalt was dried with a heat lamp and then treated with anhydrous ammonia. The resulting neutralized product was dried overnight in a vacuum oven and then treated once again with anhydrous ammonia. The product was then ground to pass a 10 mesh screen and the ground product was then further treated with anhydrous ammonia.

A water base drilling fluid comprising 30 gm. of the sulfonated product and 170 ml. of water had a fluid loss of 21.4, while an oil base drilling fluid comprising 10 gm. of the sulfonated material and 390 ml. of No. 2 diesel fuel had a fluid loss (oil) of 7.0 ml.

*Example XIV*

A sulfonated asphaltene was prepared in the following manner, using the same starting material as Examples VII, VIII, IX, X, and XIII. One hundred forty-five and two-tenths grams of asphaltenes were dissolved in about 900 ml. of $SO_2$ at about −4° F. Twenty-four ml. of $SO_3$ were then added dropwise with stirring over a period of 30 minutes, after which stirring was contained for 5 minutes. Fifteen ml. of water were then added dropwise to the sulfonation mixture with stirring over a period of 8 minutes, during which heating was continued for 5 minutes. The $SO_2$ in the sulfonation mixture was expelled by gradually increasing the temperature of the bath surrounding the reactor until the temperature of the water reached 212° F., which temperature was held for 15 minutes. The resulting dried sulfonated asphaltenes were treated thoroughly with anhydrous ammonia and then ground to pass a No. 30 sieve.

A water base drilling fluid comprising 30 gm. of the sulfonated material and 170 ml. of water gave a fluid loss of 8.6 ml. Several other water base drilling fluids were prepared each containing 170 ml. of water, one containing in addition 20 gm. of the sulfonated asphaltenes and 10 gm. of the sulfonated maltenes prepared in Example XIV gave a fluid loss of 8.8, and another containing in addition 10 gm. of the sulfonated asphaltenes and 20 gm. of the same sulfonated maltenes gave a fluid loss of 7.7 ml.

*Example XV*

A sulfonated cracked asphalt was prepared in the following manner. The starting material was that obtained from a third stage vacuum tower bottom charged with West Texas-New Mexico crude. This starting material had a Ring and Ball Softening Point of 170° F. Three hundred grams of the starting material were dissolved in about 1400 ml. of n-hexane. The resulting solution was cooled in ice and 60 ml. of $SO_3$ were added dropwise with stirring over a period of 22 minutes, after which stirring was continued for an additional 14 minutes. One hundred and four ml. of water were then added gradually with stirring to the reaction mixture, after which stirring was continued for an additional 7 minutes. Anhydrous ammonia was then bubbled into the resulting sulfonation mixture over a period of 2 hours, 25 minutes, the n-hexane was then removed by vacuum distillation and the sulfonated product then dried in a vacuum oven and ground to pass a No. 30 sieve.

Several different drilling fluids were prepared containing this sulfonated product and the compositions of these fluids and their determined fluid losses are set forth in the following table.

| Ingredient | Drilling Fluid Sample | | | | | |
|---|---|---|---|---|---|---|
| | 1 | 2 | 3 | 4 | 5 | 6 |
| Sulfonated material, gm | 10 | 30 | 20 | 20 | 0 | 0 |
| Water, ml | 0 | 170 | 350 | 350 | 350 | 350 |
| No. 2 Diesel fuel, ml | 390 | 0 | 15 | 15 | 0 | 15 |
| McCracken clay, gm | 0 | 0 | 0 | 37.2 | 37.2 | 37.2 |
| Fluid Loss, ml | [1] 4.3 | 8.2 | 39.0 | 22.0 | 99 | 80 |

[1] Oil.

Sample 1 was an oil base drilling fluid, sample 2 was a water base drilling fluid, and samples 3 and 4 were oil-in-water drilling fluids. Samples 5 and 6 were blanks or controls.

In addition, seven oil-in-water emulsion drilling fluids were prepared each comprising 0.25 gm. of the sulfonated material, 315 ml. of water, and Soltrol 170 (a highly branched, heavy alkylate), the amount of the latter in the first emulsion being 35 ml. and the amount in the other emulsions being serially increased by 35 ml. increments. These emulsions were fairly stable, indicating that the sulfonated material functions as a good oil-in-water emulsifier.

*Example XVI*

A sulfonated cracked asphalt was prepared in the following manner, using the same starting material as that in Example XV. Three hundred grams of the same starting material were dissolved in about 800 ml. of n-hexane. The solution was cooled in an ice bath and 100 ml. of $SO_3$ were added dropwise with stirring over a period of 1 hour, 50 minutes, after which stirring was continued for an additional 30 minutes. One hundred and fifty ml. of water were then added dropwise to the sulfonation mixture. The n-hexane was then removed by vacuum distillation, using a water-bath (212° F.) to heat the reaction vessel. Ninety-six grams of NaOH in 300 ml. of water were then added to the sulfonation mixture and the solution was refluxed for 30 minutes. The solution was then evaporated to dryness and the resulting solid sulfonated product dried overnight in a vacuum oven and then ground to pass a No. 30 mesh screen.

Several different drilling fluids were prepared and their compositions and fluid losses are set forth in the following table.

| Ingredient | Drilling Fluid Sample | | | | | |
|---|---|---|---|---|---|---|
| | 1 | 2 | 3 | 4 | 5 | 6 |
| Sulfonated material, gm | 10 | 30 | 20 | 20 | 20 | 20 |
| McCracken clay, gm | 0 | 0 | 37.2 | 37.2 | 37.2 | 37.2 |
| Water, ml | 0 | 170 | 350 | 350 | 350 | 350 |
| No. 2 Diesel fuel, ml | 390 | 0 | 0 | 5 | 10 | 15 |
| Fluid loss, ml | [1] 4.0 | 11.7 | 36 | 18.8 | 13.4 | 10.2 |

[1] Oil.

*Example XVII*

A sulfonated blown asphalt was prepared in the following manner. A sample of starting material like that of Examples XV and XVI was heated to 392–464° F. and blown with air for 18 hours. Some of the resulting blown asphalt was then ground in a Waring Blendor to pass a 30 mesh screen. Three hundred grams of the ground blown asphalt were dissolved and dispersed by gentle heating and stirring in about 1 liter of n-hexane. The solution was placed in an ice bath and 60 ml. of $SO_3$ were added dropwise with stirring to the resulting solution, over a period of 90 minutes, after which stirring was continued for 15 minutes. Ninety ml. of water were then added slowly to the sulfonation mixture with stirring. The n-hexane was then removed by vacuum distillation. Fifty-seven grams of NaOH and 300 ml. of water were added to the sulfonation mixture and the resulting neutralized mixture refluxed for 30 minutes. The resulting mixture was then evaporated to dryness on a hot plate and the resulting solid sulfonated asphalt product dried in a vacuum oven overnight and ground to a powder.

Several drilling fluids were prepared containing the sulfonated material and their compositions and fluid loss are set forth in the following table.

| Ingredient | Drilling Fluid Sample | | | | | |
|---|---|---|---|---|---|---|
| | 1 | 2 | 3 | 4 | 5 | 6 |
| Sulfonated material, gm | 10 | 30 | 20 | 20 | 20 | 20 |
| McCracken clay, gm | 0 | 0 | 37.2 | 37.2 | 37.2 | 37.2 |
| Water, ml | 0 | 170 | 350 | 350 | 350 | 350 |
| No. 2 Diesel fuel, ml | 390 | 0 | 0 | 5 | 10 | 15 |
| Fluid loss, ml | [1] 1.8 | 11.0 | 31.4 | 22.1 | 19.3 | 17.1 |

[1] Oil.

Various modifications and alterations of this invention will become apparent to those skilled in the art without departing from the scope and spirit of this invention, and it is to be understood that the foregoing discussion and examples are illustrative of preferred embodiments and do not unduly limit this invention.

We claim:

1. In a process of drilling a well with well drilling tools, the step of circulating in said well a drilling fluid containing a salt selected from the group consisting of the ammonium and alkali metal salts of sulfonated asphalt in an amount sufficient to reduce the filtration rate of said drilling fluid.

2. In a process of drilling a well with well drilling tools, the improvement comprising circulating through said well, during said drilling, a drilling fluid comprising a fluid medium and a sulfonated asphalt suspended therein, said sulfonated asphalt being selected from the group consisting of the ammonium and alkali metal salts of a sulfonated asphalt, said sulfonated asphalt being present in an amount of about 0.1 to about 10 pounds per barrel of said drilling fluid.

3. The process according to claim 2 wherein said sulfonated asphalt is an ammonium salt.

4. The process according to claim 2 wherein said drilling fluid is a water base drilling fluid.

5. The process according to claim 2 wherein said drilling fluid is an oil-containing drilling fluid.

6. The process according to claim 2 wherein said drilling fluid is an oil-in-water emulsion.

7. The process according to claim 2 wherein said drilling fluid is a water-in-oil emulsion.

8. The process according to claim 2 wherein said drilling fluid further comprises clay.

9. The process according to claim 2 wherein said drilling fluid further comprises sodium carboxymethyl cellulose.

10. The process according to claim 2 wherein said drill-fluid further comprises clay and sodium carboxymethyl cellulose.

11. The process according to claim 2 wherein said sulfonated asphalt is an alkali metal salt.

12. The process according to claim 11, wherein said alkali metal is sodium.

13. A well-working fluid comprising a fluid medium and a sulfonated asphalt selected from the group consisting of the ammonium and alkali metal, salts of a sulfonated asphalt, said sulfonated asphalt being dispersed in said fluid medium and present in an amount sufficient to reduce the filtration loss of said well-working fluid.

14. The well-working fluid according to claim 13 wherein said sulfonated asphalt is an ammonium salt.

15. The well-working fluid according to claim 13 wherein said sulfonated asphalt is an alkali metal salt.

16. An aqueous base drilling fluid comprising water and a sulfonated asphalt selected from the group consisting of the ammonium and alkali metal salts of a sulfonated asphalt, said sulfonated asphalt being dispersed in said water and present in an amount sufficient to reduce the filtration loss of said drilling fluid.

17. An oil-containing drilling fluid comprising oil and a sulfonated asphalt selected from the group consisting of the ammonium and alkali metal salts of a sulfonated asphalt, said sulfonated asphalt being dispersed in said oil and present in an amount sufficient to reduce the filtration loss of said drilling fluid.

18. An oil-in-water emulsion drilling fluid comprising an emulsion of oil in water and a sulfonated asphalt selected from the group consisting of the ammonium and alkali metal salts of a sulfonated asphalt, said sulfonated asphalt being dispersed in said emulsion and present in an amount sufficient to reduce the filtration loss of said drilling fluid.

19. A water-in-oil emulsion drilling fluid comprising an emulsion of water in oil and a sulfonated asphalt selected from the group consisting of the ammonium and alkali metal salts of a sulfonated asphalt, said sulfonated asphalt being dispersed in said emulsion and present in an amount sufficient to reduce the filtration loss of said drilling fluid.

20. A drilling fluid comprising a fluid medium and a sulfonated asphalt selected from the group consisting of the ammonium and alkali metal salts of a sulfonated asphalt, said sulfonated asphalt being dispersed in said fluid medium and present in the amount of about 0.1 to about 10 pounds per barrel of said drilling fluid.

21. The drilling fluid according to claim 20 wherein said sulfonated asphalt is a sodium salt.

22. The drilling fluid according to claim 20 wherein said sulfonated asphalt is prepared by sulfonating asphalt with sulfur trioxide and neutralizing the resulting sulfonic acids with sodium hydroxide.

References Cited in the file of this patent

UNITED STATES PATENTS

| | | |
|---|---|---|
| 2,223,027 | Dawson et al. | Nov. 26, 1940 |
| 2,241,255 | Garrison | May 6, 1941 |
| 2,299,469 | D'Antal | Oct. 20, 1942 |
| 2,605,222 | Jones | July 29, 1952 |
| 2,748,057 | Goren | May 29, 1956 |
| 2,773,031 | Tailleur | Dec. 4, 1956 |
| 2,885,336 | Goren | May 5, 1959 |
| 2,953,525 | Young | Sept. 20, 1960 |

OTHER REFERENCES

Sperling: Sulfonation Products of Mineral Oil, Ind. & Eng. Chem., vol. 40, May 1948, pp. 890 to 896.